United States Patent [19]
Lunde et al.

[11] Patent Number: 5,636,595
[45] Date of Patent: Jun. 10, 1997

[54] PARTICLE TRAP

[76] Inventors: Trygve Lunde, Haudal, 7084, Helhus; Steinar Skybakmoen, Nordslettveien 177, N-7038; Idar Schei, Tankveien 13A, N-7046, both of Trondheim, all of Norway

[21] Appl. No.: 347,447
[22] PCT Filed: May 25, 1993
[86] PCT No.: PCT/NO93/00081
  § 371 Date: Jan. 23, 1995
  § 102(e) Date: Jan. 23, 1995
[87] PCT Pub. No.: WO93/23994
  PCT Pub. Date: Dec. 9, 1993

[30] Foreign Application Priority Data

Jun. 1, 1992 [NO] Norway ............................ 922164
Jun. 1, 1992 [NO] Norway ............................ 922165

[51] Int. Cl.⁶ .................................................. A01K 63/04
[52] U.S. Cl. ................................. 119/224; 119/232
[58] Field of Search .............................. 119/226, 227, 119/228, 229, 232, 224

[56] References Cited

U.S. PATENT DOCUMENTS 4,655,169  4/1987  Pullola ............................ 119/228
5,293,839  3/1994  Jorgensen ....................... 119/232

FOREIGN PATENT DOCUMENTS

1913703  5/1970  Germany ........................ 119/228
216158   12/1984 Germany ........................ 119/228
644426   1/1979  U.S.S.R. ........................ 119/232
2242140  9/1991  United Kingdom ........... 119/228

Primary Examiner—Todd E. Manahan
Attorney, Agent, or Firm—James E. Pittenger

[57] ABSTRACT

A device for removal of sediment particles from the water in a cultivating tank for aquatic organisms. The cultivating tank has a cylindrical outlet connected to an outlet tube located on the vertical axis of symmetry of the cultivating tank. A plate is spacedly positioned above the upper edge of an annular chamber formed at the bottom of the tank around the outlet to form a slotted opening into the annular chamber. The annular chamber has a separate outlet formed in or near the bottom for carrying away particles accumulated within the chamber. The portion of the cylindrical outlet near the upper area of the chamber includes a plurality of orifices arranged to collect and withdraw relatively clear water. In an other embodiment, the cultivating tank having a flat bottom can have a cone shaped inwardly tapering section surrounding the cylindrical outlet which forms the annular chamber. The tapering section rises inwardly to a point near a spaced circular plate so as to form a slotted opening to the chamber for removing the particles from the water. The same outlet arrangements may also be used for monitoring separate tanks within a zonal divided tank. In this way, the particle count in each zone can be monitored. The monitoring of the particular concentration within the tank is used for controlling feeding, water provision and oxygen provision for the aquatic organisms.

18 Claims, 7 Drawing Sheets

Fig_1

Fig_2

Fig_3

Fig_4

Fig_5

Fig_6

Fig_7

Fig_8

Fig_9

PARTICLE TRAP

The present invention concerns a device for removal of sediment particles from the water in a basin or tank for cultivating aquatic organisms.

Previously known cultivating plants have a small degree of separation of sediment particles from the water outlet. Presently, a lot of work is being done on a number of different solutions for screening or filtering particles from the outlet water. This is expensive due to the great volume of outlet water.

Most existing cultivating plants are incorrectly dimensioned if self-purification of the tank and outlet system is to be achieved. Purification of tanks and transport of particles in the outlet system is dependent on manual brushing and abrupt draining of the tanks. This means that the plants for separation of particles are being subjected to maximal hydraulic load at the same time, and consequently the plants should be dimensioned for this shock treatment.

In this kind of cultivation tank, the body of water rotates through the vertical axis of symmetry in the center of the tank. The flow conditions are established by use of the inlet and outlet arrangement for water supply and draining of the tank.

The water supply is located in the tank wall and the inlet comprises at least one underwater jet having a flow direction adapted to the desired flow pattern in the tank.

The outlet from the tank is located centrally in the bottom of the basin on the vertical axis of symmetry of the tank. The outlet arrangement may be different geometrical shapes; plane drainage with outlet in the top and/or distributed along the tower. The outlet arrangement should be dimensioned so that there will be established a combination of a forced and free vortex (Rankine's combined vortex). The outlet vortex represents a substantial contribution to the flow pattern that is desired in the tank and simultanously is an important factor in the flow patterns internally in the particle trap according to present invention.

The flow conditions that are established in the tank can be separated in a primary and secondary system the primary flow rotates the body of water about the vertical axis of symmetry and is established using the inlet and outlet arrangement. The secondary flow has an angular direction 90° relatively to the primary flow, and is approximately ⅕–1/10 of the primary flow. The secondary flow comes into existence due to friction in the boundaries between the body of water and the bottom and the walls of the tank. The secondary flows are directed down the wall and in to the center of the tank, adjacent to the bottom of the tank.

Today, the food spill represents a substantial part of the particles in the outlet water. This is also a source of pollution in the outlet water.

Removal of sediment particles from the water can be separated into four distinct steps:

1) The sediment particles sink to the bottom of the tank and are transported along spiral paths made up by the secondary flows along the bottom and the primary flow of the tank, which spiral paths correspond to the vertical axis of symmetry for the primary flow.
2) The particle-enriched bottom water flows in a mud cavity as a particle-enriched partition outlet from the tank, while the particle-free water is expelled in a main outlet.
3) The particle-enriched partition outlet flows in a particle trap, where the sediment particles are removed from the water body. The sediment particles sink to the bottom of the particle trap and the outlet vortex takes care of the neccesary transportation of the particles on the bottom to the particle outlet which is constructed as a slot in the bottom the slot being transverse to the direction of movement of the particles.
4) The particle outlet from the particle trap is transported as a particle-enriched flow through a tube or hose to a separation unit which is installed outside the tank. The separation unit can be constructed as a vortex chamber. In the separation unit the particles are collected, and concentrated to a mud having a solid content of about 8%, before it is optionally transported for further treatment by some kind of mudstabilizing before deposition, or use as e.g. growth medium for production of plants.

The present invention concerns a device that takes care of step 3) in the separation process.

Previously, efforts to solve problems related to dimensioning, construction and operation of cultivation plants have tried to use flow conditions and hydraulic operation of tank and cultivation plant. There are previously known outlet arrangements having separated outlets with one particle-free outlet, and one outlet for particle-enriched water being purified in some form of particle separation. Norwegian patent publication 160.753 describes an invention working on this principle. Furthermore, British patent publications 2.241.857 and 2.242.140 disclose similar arrangements. In these known devices, a main outlet is located in the middle of the cultivation tank, e.g. a tower outlet formed by perforated tube or similar. At the bottom a slot orifice is located and communicates with an additional outlet for particle-enriched water. Removal of particles by separated outlets is a solution based upon step 1 and 2 in the above described process of separation.

Even with a separated outlet, the particle-enriched partial flow represents a comparatively large outlet volume (30–40% of the total volume) and therefore a substantial purification cost. Most existing plants have an outlet system which is incorrectly dimensioned and can not be upgraded without extensive rebuilding.

Another problem which can be solved with the present invention is separate monitoring of zones in a zonal divided tank for cultivation of aquatic organisms.

Cultivating tanks divided into zones are previously known, e.g. from Norwegian patent application 870089 and NO-patent application 884812. In a zonal divided cultivating tank, a common body of water has flow patterns in the different zones created by separate water inlets and water outlets. Between the zones there may be an opening, optionally a screen to hinder fish in different zones from passing between the zones. The screen may also be constructed as a sorting screen for the purpose of permitting only the smallest fish to move from one zone to another.

In this kind of cultivation tank, the body of water rotates through the vertical axis of symmetry in the center of each zone. The flow conditions are established by use of the inlet and outlet arrangement for water supply and draining of the zone, corresponding to the flow patterns in a single tank.

In NO-patent application 870089, the replacement of water is effected by making the total body of water of one zone flow in a recycling loop. Optionally, the water may be purified in a precipitation basin which is common to the different zones. In such a system, the operational monitoring of each particular zone will demand a monitoring of the total body of water, in order to acheive an accurate description of deposits in the zone. On account of this large water flow, certain problems arise, e.g. in location of sensors, etc.

Norwegain patent application 884812 discloses a tank divided into zones, also having divided outlets, where only a part of the total body of water body flows in the recycling loop. The purest water is extracted from the surface in each zone for treatment in a recycling loop and is supplied to the zone as purified water. The most contaminated water is extracted from the bottom of each zone, and it may then be easier to monitor this part of the water flow to get a picture of relevant environmental parameters in the zone. However, the partial flow also represents such a great outlet volume, that it is difficult to conduct a simple and continous measurement of the relevant parameters.

It is therefore an object of the present invention to provide a device where the volume of the particle outlet is reduced and simultaneously the concentration of particles is enhanced.

The particle trap introduces new possibilities for control of the operation of tanks and aqutic organisms. The cultivator could easily register changes in the appetite of the organisms by observing the food spill in the particle outlet. Food that is not eaten will have a total resident time in the tank and the particle trap of less than 5 minutes. By automatically controlling the food spill in the particle outlet (optical and/or acoustic sensors), food utilization and food spill can be registered over this time period, thus, logical control of the food provision units may be acheived leading to more economical operation and better conditions in the tank.

Outbreak of disease etc. resulting in reduced appetite will, in this system, be registered at an early stage as an aberration from normal operation.

The relation between supplied food and registrated spill will represent a direct indication of growth in the biomass at any time without any handling and weighing of the fish. This means a better monitoring of the biomass and the development thereof.

The particle trap may also be used as a separation unit for sediment particles by treatment and purification of water and other fluids, as well as particle separation by purification of gases. It may also be used in source screening of the outlet before it is led to a muncipal drainage system.

In the following, the invention will be described in more detail, by examples of embodiments of the invention and with reference to the enclosed drawings, where.

Figure 1:
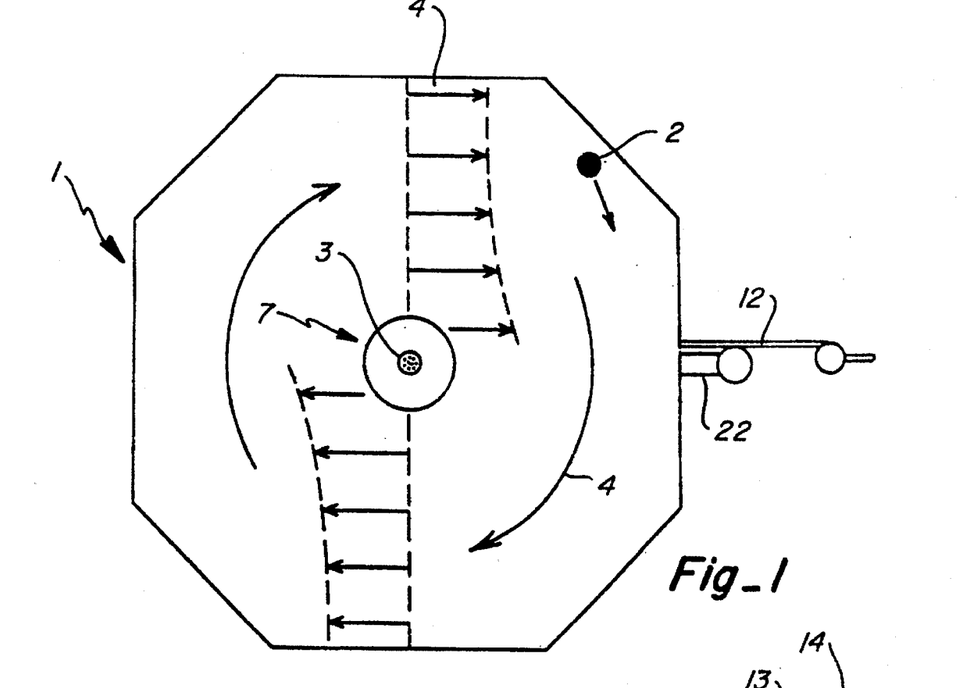
FIG. 1 is a view from above of a cultivation tank according to the present invention, and in which flow conditions are illustrated.
Figure 2:
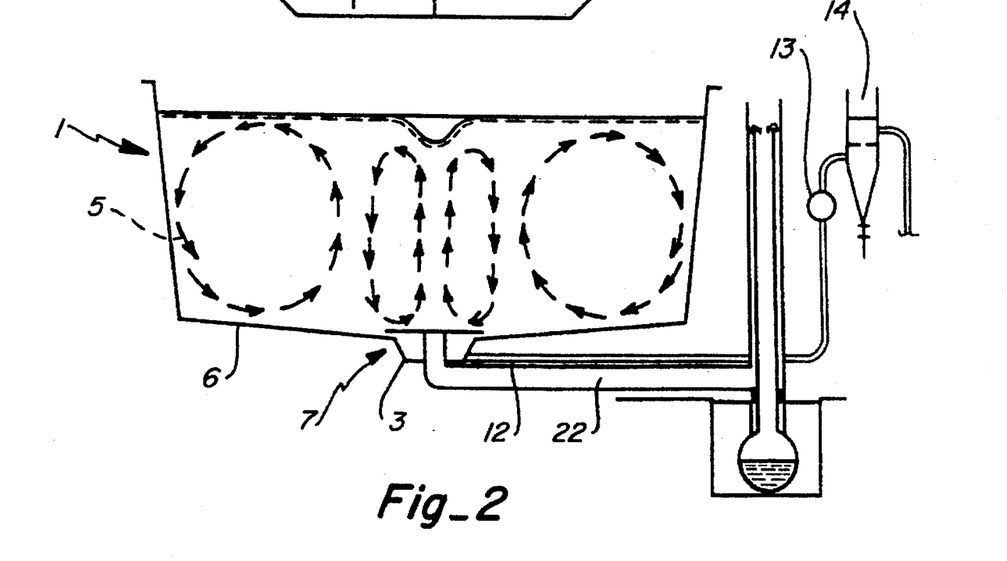
FIG. 2 is a flow diagram showing a lateral view of the cultivation tank of FIG. 1.

A condition for proper functioning of the particle trap is that it is integrated in a tank or basin which has a flow according to step 1) in the process described above. FIGS. 1–2 show in more detail a cultivation tank 1 having a water inlet 2 and a main outlet 3 giving a flow system with particle separation as in step 1). A primary flow system 4 and a secondary flow system 5 provide for the transport of sediment particles at the bottom 6 of the tank 1 to a particle trap 7 which is installed at the main outlet 3 near the bottom 6 center on the vertical axis of symmetry of the flow pattern.

Figure 3:
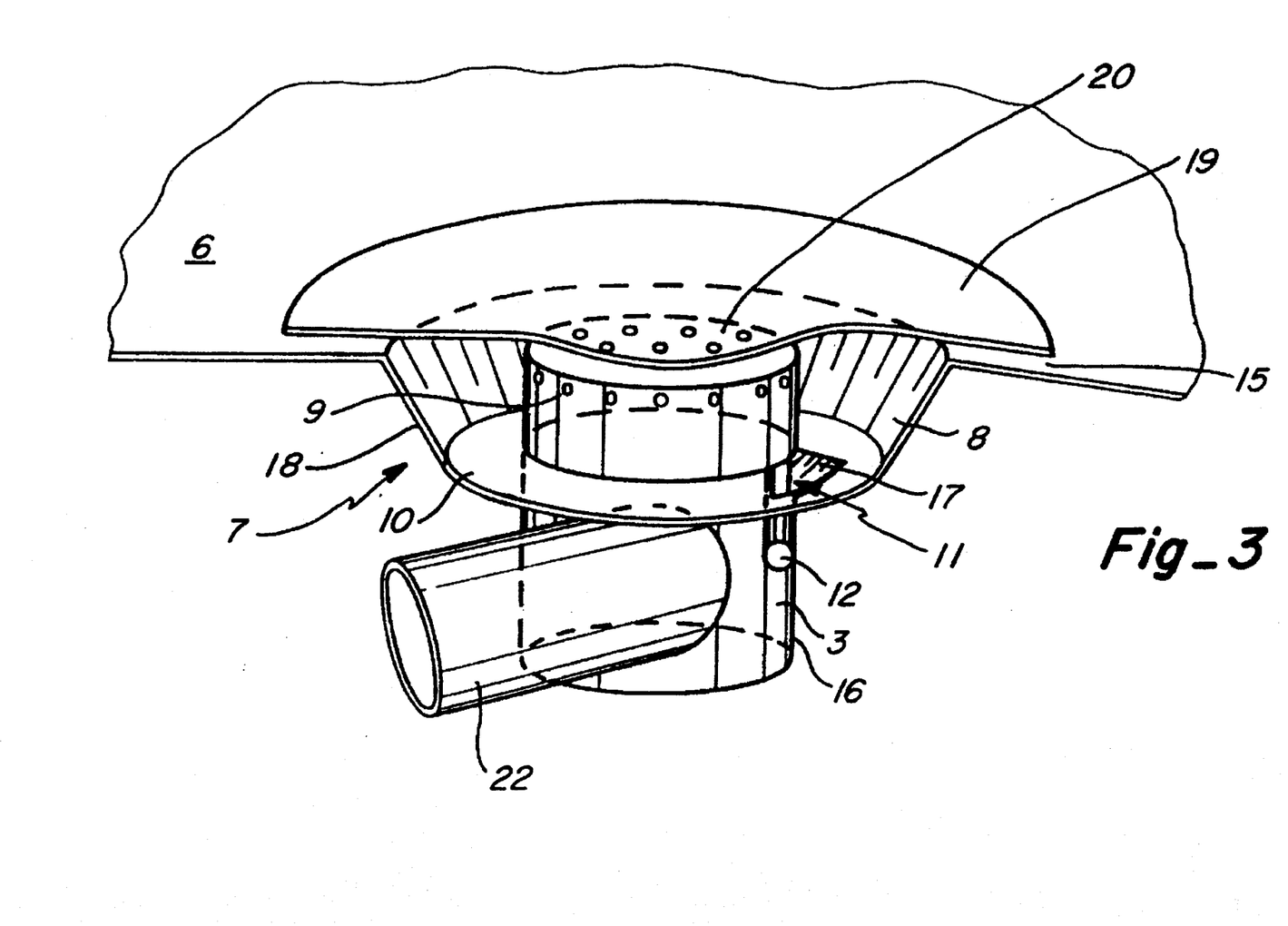
FIG. 3 is a perspective partly sectioned view of a detail of the cultivation tank in FIGS. 1–2, FIG. 4 as a partial dissected view of the tank outlet showing the fluid flow path.
Figure 4:
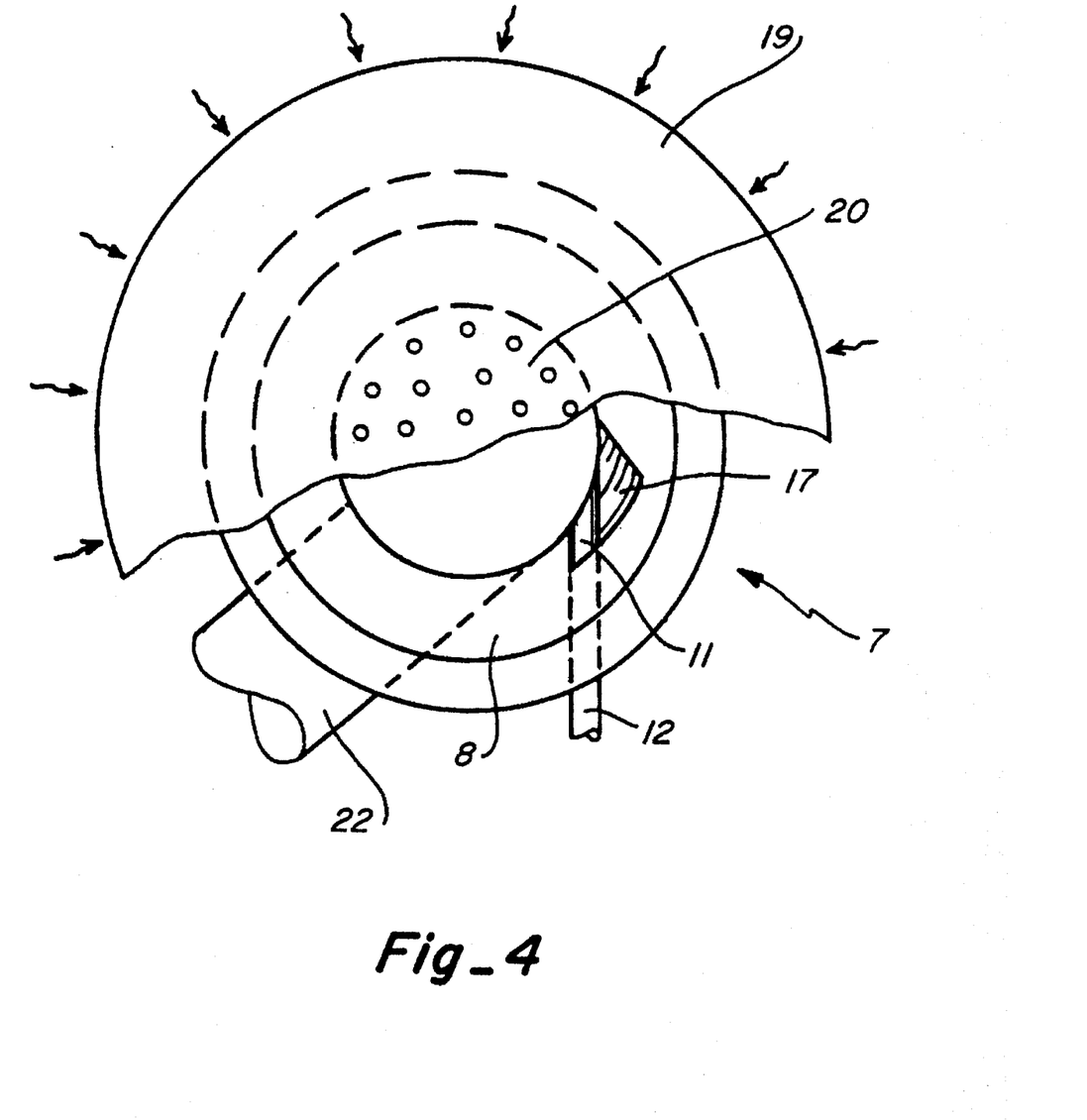

FIGS. 3–4 show the system having a main outlet through a screen 20, and the particle trap used in step 2) and 3) in the separation process. The trap is constructed as an annular chamber 8 installed around the main outlet 3. Further separation of sediment particles from the water flow occurs in the verticle trap and is neccesary for transport of the particles through an inlet slot 15 to the annular chamber 8. When the water passes from the annular chamber 8 to the main outlet 3 through a row of circular or elliptic orifices 9, the sediment particles are separated from the water flow and sink to the bottom 10 of the annular chamber 8. The vortex 5 over the main outlet 3 makes the particles at the bottom 10 of the annular chamber 8 move to a slot 11 in bottom 10 and out a particle outlet 12.

FIG. 2 illustrates how the particles are transported in the particle outlet 12 to a sensor 13 where any food particles are identified and registered before the particles are separated and concentrated in a separation unit 14. The separation unit 14 represents step 4) in the separation process.

FIG. 3 shows an example of the construction of the particle trap in more detail. The particle trap 7 is of circular construction with the cylindrical inner wall 16 corresponding to the outer wall of the main outlet from the tank. The bottom 10 is circular with the slot orifice 11 for the particle outlet 12. The slot 11 is situated tangentially in relation to the inner wall 16 and the bottom 10 in front of the slot orifice 15 is lowered, forming a slant 17. The outer wall 18 of the annular chamber 8 is in the form of an inverted cone. The annular chamber is partitioned from the remaining volume of water in the tank by a circular plate 19, which defines a circular, vertical slot 15 with bottom 6 of the tank. The water flowing into the particle trap 7 has an outlet to the main outlet 3 through orifices 9 in the upper edge of the cylindrical inner wall 16.

The particle rich bottom flow in the tank flows into the particle trap 7 through the slot 15. In the annular chamber 8, sedimented particles are separated from the water when the particles slide along the conical outer wall 17 and down to the bottom 10, where they move due to the vortex over the main outlet 3 to the slot orifice 11 having outlet to the particle outlet 12. The water flowing in through the inlet slot 15 to the particle trap 7, flows after separation of the sediment particles out in the main outlet 3 through the row of orifices 9 near the upper edge of the cylindrical wall 16.

Below is a table which illustrates the relationship between total outlet and particle outlet for different tank sizes. The outlet volume from the particle trap is highly reduced, the reduction in percentage being very distinct at larger tank volumes.

| Tankvol.($m^3$) | Tot.outl.(l/min) | Part.outl.(l/min) | % of tot. |
| --- | --- | --- | --- |
| 3,0 | 50–100 | 6,0 | 6,0–12,0 |
| 8,0 | 80–130 | 6,0 | 4,6–7,5 |
| 50,0 | 400–800 | 30,0 | 3,8–7,5 |
| 100,0 | 800–1600 | 30,0 | 1,9–3,8 |
| 250,0 | 2000–3000 | 30,0 | 1,0–1,5 |
| 500,0 | 3000–5500 | 30,0 | 0,5–1.0 |

Figure 5:
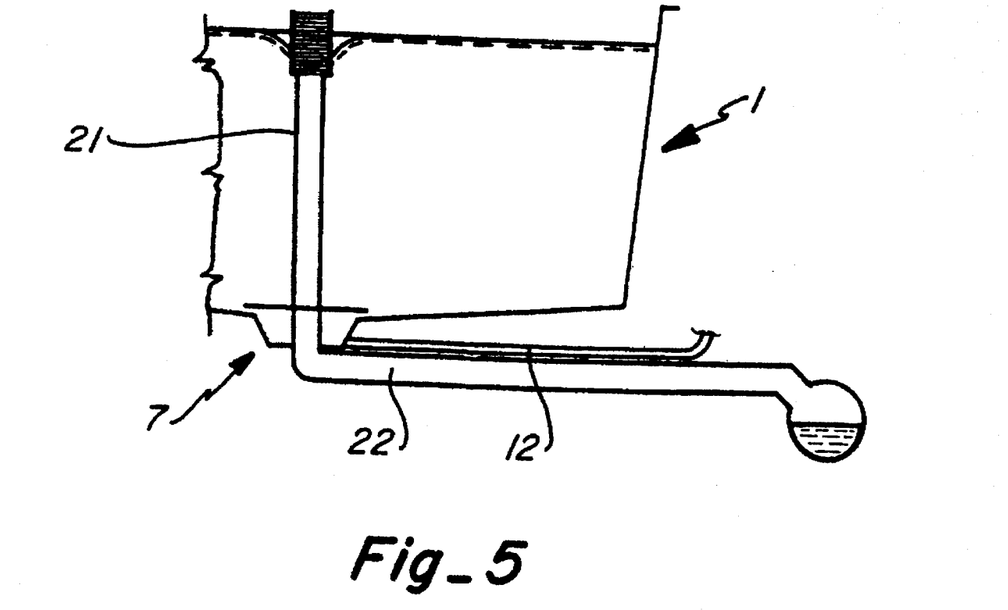
FIGS. 5–6 are lateral views of two embodiments of the invention having tower outlets.
Figure 6:
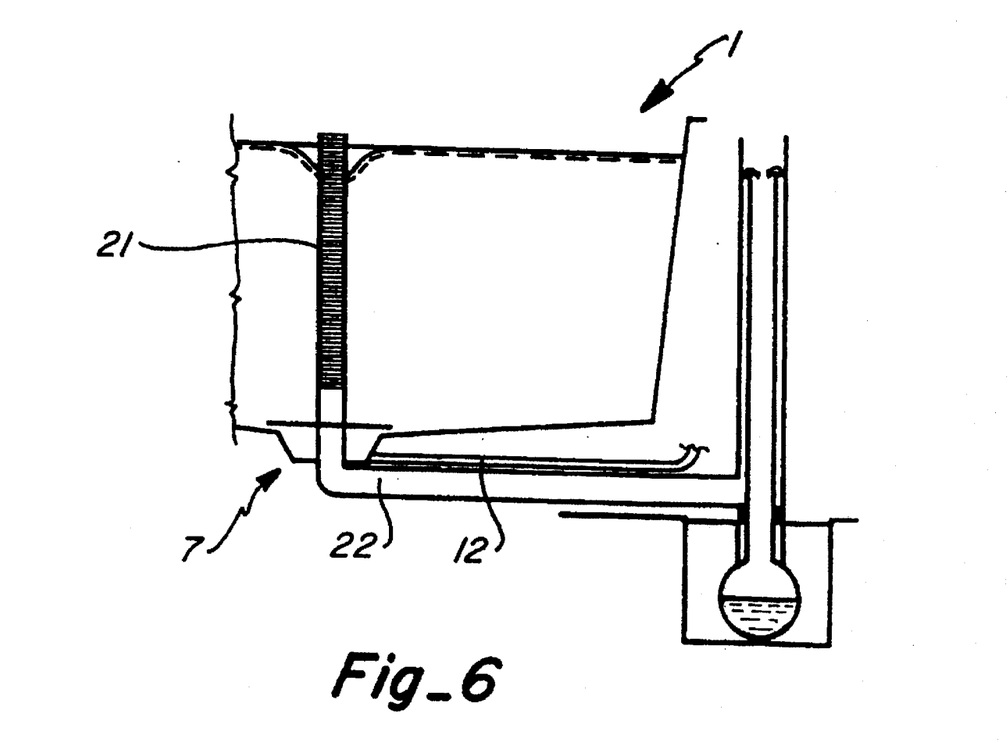

The particle trap 7 may be installed with different types of main outlets as long as the flow conditions of the tank are of the kind described in FIGS. 1–2. In FIG. 1–4 are disclosed examples of plane drains at the bottom of the tank, having outer regulation of the water level in the tank. In FIGS. 5–6 are shown examples of tower outlets 21, having drainage distributed over the depth of the tank, with outer regulation of the water level in the tank.

The described device may be constructed with an alternative particle outlet and slot where the outlet is directed inwardly under the main outlet instead of outwardly, away from the main outlet. The rotation in the tank and the particle trap will be in a direction opposite the rotation of flow of the described solution, and the bore in the bottom in front of the slot orifice will therefore be located at the opposite side of the slot. In addition to the slot crossing the bottom of the trap it will also cross the inner wall of the particle trap.

Figure 7:
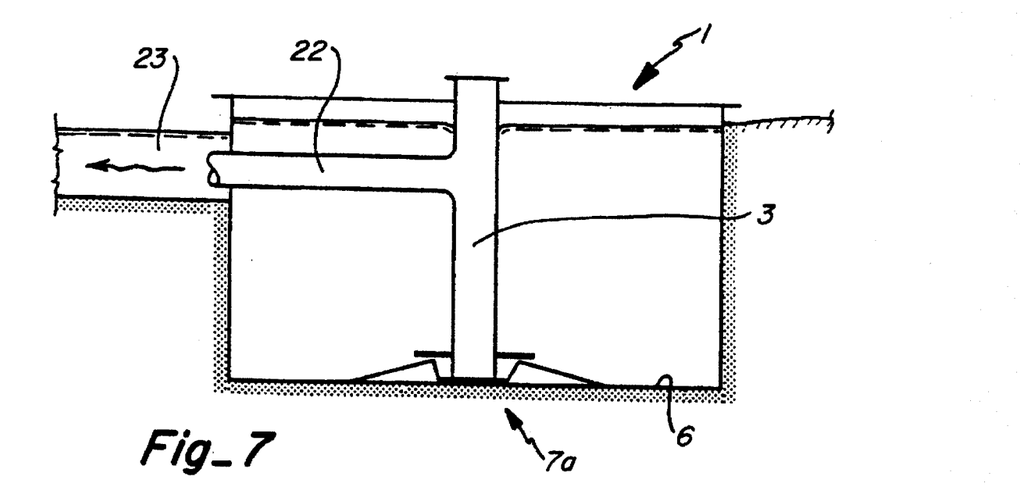
FIGS. 7–8 show sections of an embodiment of the invention for use in existing cultivation tanks.
Figure 8:
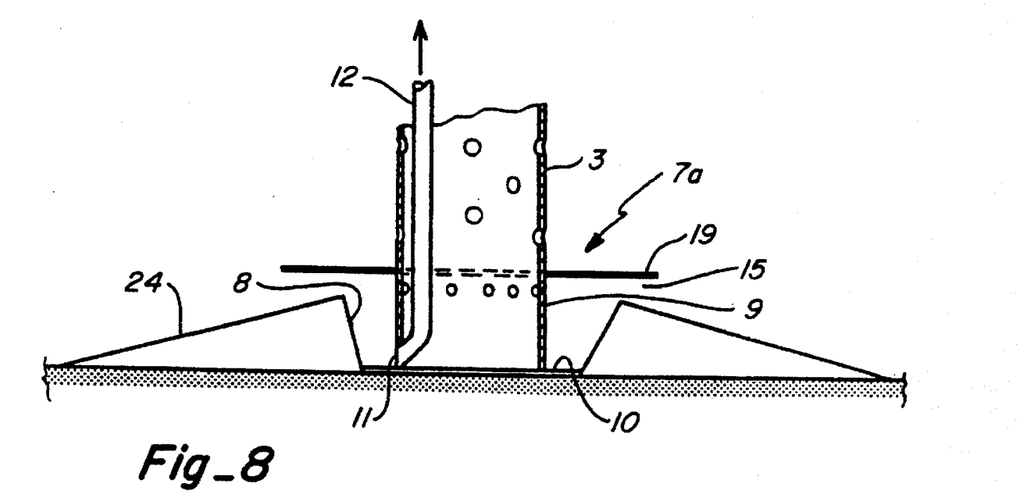

In FIGS. 7 and 8 there is shown an embodiment of present invention which is constructed for installation in existing cultivation tanks 1. This embodiment fits in cultivation tanks having a bottom cast in one piece and which do not have the outlet arrangement cast in the bottom. The illustrated tank is buried and the main outlet is constructed as a tower having 2 horizontal outlet 22 to an outlet channel 23 through a sunken tube in the tank wall. The particle trap 72 corresponds in principle to the above described solutions as it is located around the main outlet and limited against the tank by a circular, horizontal plate 19. The particle trap 72 comprises a section 24 extending in a slanted manner upwardly and inwardly from the bottom of the tank to 72, slot 15. As described above, the particles are separated from the water leaving the particle trap through orifices 9 leading to the main outlet. The particles sink to the bottom 10 of the particle trap and rotate with the flow along the inner wall 18. In the inner wall near the bottom 10 is situated a slot orifice 11 leading to the particle outlet tube 12 which is inside the main outlet 3.

Figure 9:
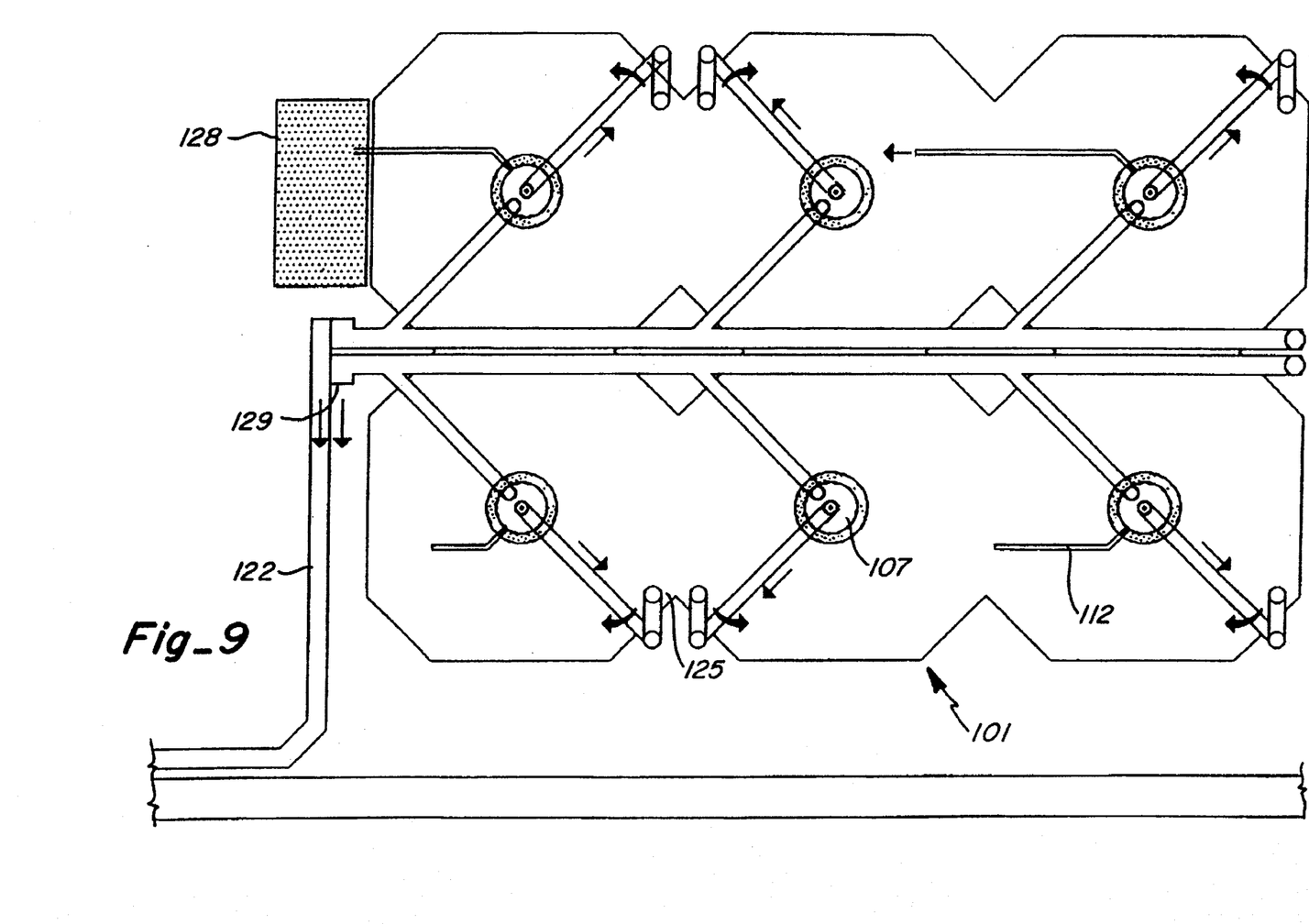
FIG. 9 shows a cultivating tank viewed from above, the tank being divided in zones and having separate monitored mud units.

FIG. 9 shows a cultivation unit 101 divided into zones, having separate water inlets and outlets for each zone. Each zone has a flow pattern according to step 1) above, so that fish are more likely to stay in the zone, and the desired primary flows and secondary flows are created. In the same manner as in a single tank, the primary flows in a zone will put the water in a spiral flow directed to the center. Secondary flows and bottom flows are intensified by the removal of water from the zone through the outlet. The inlet of water, outlet of water, the formed primary flows and the formed secondary flows will together create strong bottom flows.

The particle trap 107 in the bottom of each zone is constructed in the same manner as shown in FIG. 3. After a part of the body of water is drawn through the particle trap 107, this part flows to a mud unit which is connected to monitoring equipment 127 for dynamic and static monitoring of particles drawn from the water. Preferably, measurements are done automatically using sensors, and may be performed continuously both on types of particles (chemical analysis), and total quantity of particles. This data is transfered to a control the unit, which is able to control provision of food, flow and other parameters important to the environment in each zone. In this way individual monitoring of each zone is acheived.

Figure 10:
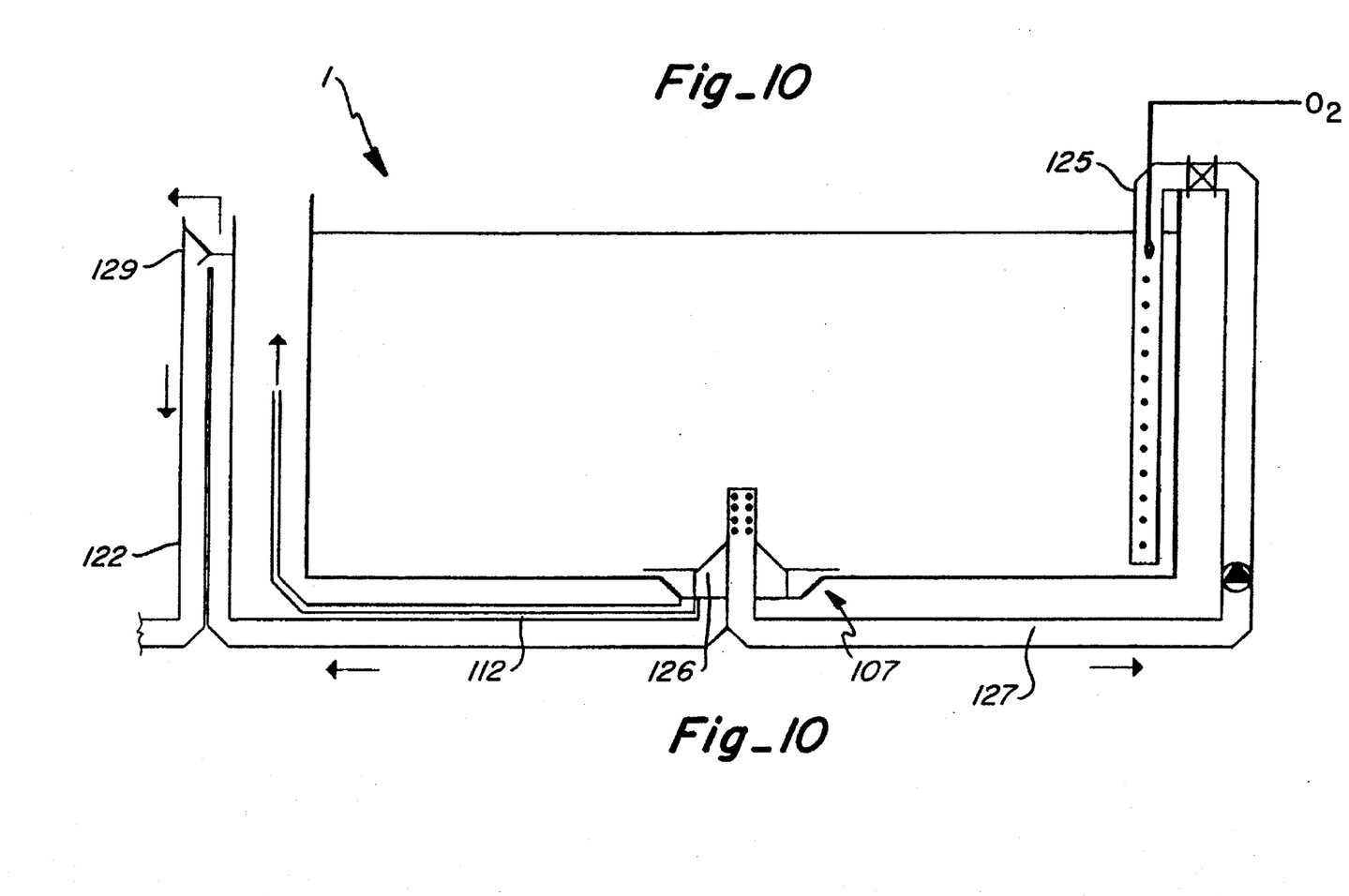
FIG. 10 is a cross section of a zone in the zonal cultivation tank of FIG. 9.

Most of the water flows in a recycling loop, as depicted in FIG. 10. Water is pumped from the tank 101 through a tube 127 to an oxygen injecting unit 125 and back to the tank 101. The individual elements in this loop can be controlled on basis of data from the mud monitoring unit 128. In connection with the particle trap there is also located a hatch 126, which can be opened as desired, for dead fish. Dead fish and any other larger remainings can be transported with the outlet water in the tube 122, to be deposited at an additional hatch 129.

We claim:

1. Device (7) for removal of sediment particles from the water in a cultivating tank (1) having a vertical axis of symmetry and, having a bottom surface (6), in which a cylindrical outlet (3), connected to an outlet tube (22), is located on the vertical axis of symmetry of the tank (1); plate means spaced from the tank bottom surface (6) to form a slot (15); an annular chamber formed adjacent to said plate means and located around the cylindrical outlet (3); said chamber being formed by a chamber bottom surface (10), outer chamber wall (18) and said plate means (19); said annular chamber (8) having an outlet tube (12) for drawing off particle-enriched water, characterized by the cylindrical outlet (3) being provided with a plurality of orifices (9) for drawing particle-poor water, said orifices (9) are situated within the upper portion of the annular chamber (8).

2. Device according to claim 1, characterized by the plates means (19) being a plate (19) that at least partially overlaps the upper edge of the chamber wall (18).

3. Device according to claim 2, characterized by the plate being circular in its perimeter configuration.

4. Device according to claim 1, characterized by a slant, lowered bottom section being located in the chamber (8) by the outlet (12) for particle-enriched water.

5. Device according to claim 1, characterized by the outlet (3) being coverd with a screen (20), and the plate means (19) surrounds the outlet screen (20).

6. Device according to claim 1, characterized by the outlet (3) communicating with a tower outlet (21) of the tank (1).

7. Device according to claim 6, characterized by the tower outlet (21) of the tank (1) being constructed such as to draw fluid from near the surface of the tank.

8. Device according to claim 7, characterized by the tower outlet (21) having an inner level regulator.

9. Device according to claim 1, characterized by the tank (1) having an outside level regulator device.

10. Device according to claim 1, for use in a cultivating tank having a flat bottom, where the outlet (3) leads outlet water up through the tank, characterized by the device (7) having a slant section (24) from the bottom (6) of the tank, which diverges inwardly and upwardly to form the annular chamber (8).

11. Device according to claim 1, characterized by including sensor means for use for separate monitoring of zones in a tank (1) for cultivation of aquatic organisms, for zonal control of feeding and water provision.

12. Device according to claim 1, characterized by a hatch (26) being associated with the particle trap to facilitate the removal of debris from the water in the outlet tube (22).

13. A particle trap device for removal of sediment particles from the water in an aquatic organism cultivating tank, the cultivating tank having a bottom surface and a vertical axis of symmetry, a first outlet means is connected to an outlet tube and is centrally positioned on the vertical axis of symmetry of said tank; the particle trap device is characterized by the device having an annular chamber formed adjacent to said outlet means and near the bottom surface of said tank, said annular chamber being formed by a surrounding wall having an upper and lower edge and a plate means positioned above the upper edge of said annular chamber to form an inlet slot for the introduction of water into the annular chamber, said annular chamber having a second outlet means provided near the lower edge of said annular chamber for drawing off the particle enriched water from said chamber and tank; and said first outlet means has one or more orifices located near the plate and within the annular chamber for allowing particle poor water to be drawn off from the tank through said first outlet means and said outlet tube.

14. A particle trap device according to claim 13, wherein the plate means is a circular plate which is spacedly positioned above the upper edge of said annular chamber to form a continuous slot around the perimeter of the annular chamber to form an inlet for the water and particles passing into said annular chamber.

15. A particle trap device according to claim 13, wherein the annular chamber includes a bottom surface and a rectangular outlet slot, said slot is positioned in said bottom surface to provide an opening for said second outlet means for drawing off the accumulated particles from the water within said annular chamber.

16. A particle trap device according to claim 15, wherein the rectangular outlet slot provided in said annular chamber is positioned adjacent to said first outlet means to collect the particles accumulated in the annular chamber.

17. A particle trap device according to claim 13, wherein the first outlet means is a tower outlet having a cylindrical pipe having an inlet for collecting and drawing off water from said tank.

18. A plurality of water filled cultivating tanks for cultivating organic organisms, each of said tanks being connected in parallel flow arrangement and each having a bottom surface and a vertical axis of symmetry; each of said tanks having a particle trap device positioned near the bottom surface of said tank and on the vertical axis of symmetry, said particle trap device being characterized by an annular chamber formed by a circular outer side wall and bottom wall and a spacedly positioned plate means, said plate means being spacedly positioned to form a continuously slotted opening at the upper portion of said annular chamber, an outlet pipe being arranged in conjunction with the bottom surface of said annular chamber for drawing off particle enriched water from said chamber, said outlet pipe having means for sensing the quality of said water for controlling the feeding, water provision and oxygen provision within the respective tank.

* * * * *